US006968361B2

(12) United States Patent
Okamura (10) Patent No.: US 6,968,361 B2
(45) Date of Patent: Nov. 22, 2005

(54) METHOD OF TRANSMITTING AND RECEIVING ELECTRONIC MAIL AND COMMUNICATION TERMINAL (75) Inventor: Tatsuaki Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 748 days.

(21) Appl. No.: 09/943,033

(22) Filed: Aug. 30, 2001

(65) Prior Publication Data

US 2002/0026490 A1 Feb. 28, 2002

(30) Foreign Application Priority Data

Aug. 30, 2000 (JP) .............................. 2000-261053

(51) Int. Cl.[7] ............................................. G06F 15/16
(52) U.S. Cl. ..................................................... 709/206
(58) Field of Search ................................ 709/206, 207

(56) References Cited

U.S. PATENT DOCUMENTS

| 5,958,005 A | * | 9/1999 | Thorne et al. ............... 709/202 |
| 6,208,996 B1 | * | 3/2001 | Ben-Shachar et al. ... 707/104.1 |
| 6,351,763 B1 | * | 2/2002 | Kawanaka ................... 709/206 |
| 6,721,784 B1 | * | 4/2004 | Leonard et al. .............. 709/206 |
| 6,757,713 B1 | * | 6/2004 | Ogilvie et al. ............... 709/206 |
| 6,775,690 B1 | * | 8/2004 | Creswell et al. ............. 709/206 |

FOREIGN PATENT DOCUMENTS

| CN | 1229489 | 9/1999 |
| EP | 0 813 161 A2 | 12/1997 |
| GB | 2350711 A | 12/2000 |
| JP | H9-8842 | 1/1997 |
| JP | H9-237254 | 9/1997 |
| JP | H10-31635 | 2/1998 |
| JP | H10-269283 | 10/1998 |
| JP | 11-85624 | 3/1999 |
| JP | 11-127189 | 5/1999 |
| JP | 11-168495 | * 6/1999 | ........... H04L 12/54 |

(Continued)

OTHER PUBLICATIONS

Gruman, "Pricey for Modest Updates," Nov. 9, 1998, Computerworld, vol. 32, Iss. 45, pp. 81ff.*

Primary Examiner—Bradley Edelman
(74) Attorney, Agent, or Firm—Scully, Scott, Murphy & Presser (57) ABSTRACT In order that a transmitting person of an electronic mail specifies an open date and hour of the electronic mail, the electronic mail is transmitted after the open date and hour is added to it. If a current date and hour is located on and after the open date and hour, the open of the electronic mail is prevented. Such prevention is attained by encrypting the electronic mail and decoding it if the current date and hour is located before the open date and hour. Moreover, when the current date and hour is changed to another current date and hour, the open date and hour is changed on the basis of the current date and hour and the other current date and hour. In this case, a relative time between the current date and hour prior to the change and the open date and hour prior to the change is equal to a relative time between the current date and hour after the change and the open date and hour after the change. This change of the open date and hour disables a receiving person from opening the electronic mail by changing the current date and hour.

12 Claims, 6 Drawing Sheets

FOREIGN PATENT DOCUMENTS

| | | | | |
|---|---|---|---|---|
| JP | H11-168495 | 6/1999 | | |
| JP | 11/203215 | * 7/1999 | ........... | G06F 13/00 |
| JP | H11-203215 | 7/1999 | | |
| JP | H11-203217 | 7/1999 | | |
| JP | H11-341561 | 12/1999 | | |
| JP | 2000-57057 | 2/2000 | | |
| JP | 2000-78308 | 3/2000 | | |
| JP | 2000-187629 | 7/2000 | | |
| WO | WO98/58321 | 12/1998 | | |
| WO | WO9858321 | 12/1998 | | |
| WO | WO00/17768 | 3/2000 | | |

\* cited by examiner

METHOD OF TRANSMITTING AND RECEIVING ELECTRONIC MAIL AND COMMUNICATION TERMINAL

BACKGROUND OF THE INVENTION

1. Field of the Invention

The present invention relates to a method of transmitting and receiving an electronic mail. More particularly, the present invention relates to a method of transmitting and receiving an electronic mail which a transmission person uses when wanting to make open the electronic mail on an appointed day.

2. Description of the Related Art

A transmitting person of an electronic mail can transmit the electronic mail at a time suitable for the transmitting person. A receiving person of an electronic mail can receive the electronic mail at any time, and can know its content by opening the electronic mail at a suitable time. If the receiving person opens the electronic mail on a day earlier than the appointed day, the receiving person may sometimes forget the content of the electronic mail on the appointed day. Moreover, the transmitting person may desire that the electronic mail will be opened on the appointed day, such as a congratulation mail for a birthday.

Conventionally, when wanting to have read the electronic mail on the appointed day, the transmitting person transmits the electronic mail on that day. However, such a transmitting method imposes a burden on the transmitting person. Even if the electronic mail is transmitted with an aim at that day, if a transmission condition at that time is accidentally poor, the electronic mail may not be sent to the receiving person. Moreover, even if the electronic mail can be transmitted on the appointed day, if the receiving person is busy, there may be a case that the electronic mail can not be immediately opened.

Such a communication terminal is well known which has a scheduler function of registering the various schedules in relation to a user as schedule data while they are correlated to the date and hour fixed for an exposition (the scheduled date and hour), the site of the exposition and the like, and reading out the schedule data as necessary of the user or at a time of an arrival of the schedule date and hour, and then displaying the schedule data for a check. In a communication terminal disclosed in Japanese Laid Open Patent Application (JP-A-Heisei, 11-341561), the schedule data read out from a self-scheduler is converted into mail data, and the mail data is transmitted to a destination terminal. Moreover, when mail data is received from a destination terminal, it is identified whether or not the mail data is schedule data. If the mail data is the schedule data, the mail data is converted into the schedule data, and the schedule data is registered in the scheduler.

In this communication terminal, the user can set and check the scheduler. Thus, an automatically registered message can be also checked prior to the date and hour of the schedule registration.

In an electronic mail apparatus disclosed in Japanese Laid Open Patent Application (JP-A-Heisei, 11-203215), when an electronic mail to which an appointed date and hour is appended is received and a current date and hour reaches the appointed date and hour, the electronic mail is automatically opened and displayed. In this electronic mail apparatus, a burden on a transmitting person can be reduced, and the content of the electronic mail can be surely reported to a receiving person. However, the electronic mail can be opened prior to the appointed day.

In a electronic mail system disclosed in Japanese Laid Open Patent Application (JP-A-Heisei, 11-168495), when an open period is appended to an electronic mail, and then an open of the electronic mail is required to a user on a receiving side, a communication terminal on the receiving side opens the electronic mail if it is in the open period, and deletes the electronic mail if it is not in the open period, and reports its fact to a communication terminal on a transmitting side, and the communication terminal on the transmitting side again transmits the electronic mail. In this electronic mail system, the electronic mail can be opened only when the open is requested in the open period. So, the terminal on the receiving side can make open the electronic mail surely in the open period. However, each time the receiving person requests the open in a period except the open period, the terminal on the transmitting side must transmit the electronic mail any number of times.

As a related art, Japanese Laid Open Patent Application (JP-A-Heisei, 9-8842) discloses "Electronic Mail System". In this electronic mail system, when an operation such as an open, a cancellation of the open, a deletion, a storage or the like of a message is performed on a first communication terminal apparatus, a controller of a communication terminal apparatus changes a state of the message stored in a memory, and transmits a control message to a server unit. A controller of the server unit transfers the transferred control message to all other communication terminal apparatuses. Controllers of all the other communication terminal apparatuses update the states of the messages corresponding to identification information represented by the transferred control message. Thus, the states of the messages can be synchronized in all the communication terminal apparatuses.

Japanese Laid Open Patent Application (JP-A-Heisei, 9-237254) discloses "Electronic Apparatus". In this electronic apparatus, under such a condition that mail data received through a communication unit is stored in a reception data register within RAM and displayed on a touch panel, when a character string indicative of a date with regard to the mail included in the mail data is specified by a pen touch, it is judged whether or not the temporal element, such as "Today", "Tomorrow", "Day Of Next Week", "Day Of Next Month" or the like, exists in the character string. In a case of the existence of the temporal element, a date with regard to the mail is specified from the temporal element based on a current date obtained on the basis of a clock signal form a clock unit, and directly captured and displayed as schedule data of a corresponding date after an actuation of a schedule mode.

Japanese Laid Open Patent Application (JP-A-Heisei, 10-31635) discloses "Portable Electronic Mail Terminal". In this portable electronic mail terminal, a radio communication unit receives a mail. A mail command decoder decodes the content of the mail, and then determines the display content. Its content is displayed on a display. When a user carries out an input operation in response to the display, in accordance with the input, the mail command decoder, if its input instructs a schedule memo call, indicates a date and an hour to a schedule manager, and instructs such that a schedule corresponding to the indication is displayed. Thus, the schedule of the date indicated in the mail is displayed on the display. Hence, the user operation can be simplified when the electronic mail is transmitted and received.

Japanese Laid Open Patent Application (JP-A-Heisei, 10-269283) discloses "Information Managing Apparatus, Information Managing Method And Storage Media For Information Management". This information managing apparatus is provided with a communicating unit, an automatic reply mail database, a mail analyzer and a mail replying unit. The communicating unit transmits and receives an electronic mail including sender information and title information representing a schedule object. The automatic reply mail database stores reply mail information including a predetermined pattern. The mail analyzer analyzes the title information of the reception mail received by the communicating unit and judges whether the content of the reception mail is a schedule report or another report. The mail replying unit, when the mail analyzer judges as the schedule report, adds the sender information of the reception mail extracted from the reception mail and intention information of a receiving person reflecting a schedule item of prestored schedule data, to the reply mail information of the predetermined pattern stored in the automatic reply mail database, and then generates a reply mail. The reply mail generated by this reply mail generator is automatically replied to the sender from the communicating unit.

Moreover, Japanese Laid Open Patent Application (JP-A-Heisei, 11-203217) discloses "Electronic Mail System, Method Of Transmitting And Receiving Electronic Mail And Storage Media". In this electronic mail system, when an electronic mail to which song data composed of MIDI data is appended is transmitted from a transmission terminal, a server computer stores this data in a memory, and reports a fact of a mail incoming to a reception terminal. The reception terminal, when receiving it, accesses to the server computer to read out a reception mail. Then, when the data is received from the server computer, character data and picture data among the reception data are displayed on a display together with a reproduction button. The MIDI data among the reception data is automatically reproduced and sounded.

SUMMARY OF THE INVENTION

Therefore, an object of the present invention is to provide a method of transmitting and receiving an electronic mail, in which a transmitting person can specify an open period of an electronic mail.

Another object of the present invention is to provide a method of transmitting and receiving an electronic mail, in which, even if a current time of a terminal on a receiving side is reset, a transmitting person can specify an open period of an electronic mail.

Still another object of the present invention is to provide a method of transmitting and receiving an electronic mail, in which a transmitting person can specify an open period of an electronic mail, and an erroneously transmitted electronic mail can be deleted from a terminal on a receiving side, in accordance with an indication of a terminal on a transmitting side.

Means for achieving the object will be described below using reference numerals and symbols used in "Embodiments of the invention". These reference numerals and symbols are added so that relation between the description of "Scope of the Patent to be Claimed" and the description of "Embodiments of the invention" is made clear. However, it is never permitted to use the reference numerals and symbols for the interpretation of technical scopes of the inventions described in "Scope of the Patent to be Claimed" and the description of "Embodiments of the invention".

A method of transmitting and receiving an electronic mail, according to a first aspect of the present invention, includes a generating step and a decoding step. In the generating step, an electronic mail to which an open date and hour is added is generated in a transmitting side communication terminal (Steps A1 to A13). In the decoding step, the electronic mail in a receiving side communication terminal after current date and hour reach the open date and hour (Steps B6 to B12). According to this construction, because the electronic mail can not be decoded prior to the open date and hour specified by a transmitting person, a receiving person can not open the electronic mail. Such encryption can protect the receiving person from directly reading the electronic mail even if a communication terminal (10) receiving the electronic mail is a personal computer.

Moreover, the method of transmitting and receiving the electronic mail according to the present invention may further include a preventing step and a requesting step. In the preventing step, in the receiving side communication terminal (10) receiving the electronic mail, the electronic mail is prevented from being decoded, until the current date and hour reach the open date and hour (Step B3). In the requesting step, when the receiving side communication terminal (10) does not have the current date and hour, it is required the receiving side communication terminal (10) to set the current date and hour. By this structure, it is possible to protect the erroneous operation caused by the non-recognition of the current date and hour, and also possible to surely prevent the electronic mail from being opened.

Moreover, the method of transmitting and receiving the electronic mail according to the present invention may further include a changing step in which when the current date and hour is changed to another current date and hour, the open date and hour based on the current date and hour and the other current date and hour is changed (Steps B9 to B10). Such change of the open date and hour disables the receiving person from opening the electronic mail by changing the current date and hour. It is desirable that a relation between the current date and hour and the open date and hour prior to the change is equivalent to a relation between another current date and hour and the open date and hour after the change.

Moreover, in the method of transmitting and receiving the electronic mail according to the present invention may include a requesting step in which the receiving side communication terminal (10) request to open the electronic mail when the current date and hour reach the open date and hour. It reports the incoming of the open date and hour to the person receiving the electronic mail, and thereby protects the receiving person from forgetting to open the electronic mail. If the communication terminal (10) has a scheduler function, the open date and hour is correlated to schedule date and hour, and the open of the electronic mail is correlated to schedule data.

Furthermore, the method of transmitting and receiving the electronic mail according to the present invention may further include the steps of: adding a mail deletion key code to the electronic mail; recording the received electronic mail together with the mail deletion key code; and deleting a plurality of electronic mails to which the same mail deletion key code is added. The transmitting person can remove the data of the electronic mail recorded in the receiving side communication terminal (10). As for two electronic mails to which the same mail deletion key code is added, both are deleted, or only the firstly received electronic mail is deleted.

A communication terminal according to a second aspect of the present invention includes a receiver (1) and a controller (2). The receiver (1) receives an electronic mail to which an open date and hour is added. The controller (2) decodes and opens the electronic mail received by the receiver (10), after current date and hour reach said open date and hour. The electronic mail can not be decoded prior to the open date and hour specified by the transmitting person, and the receiving person can not open the electronic mail. The communication terminal according to the present invention includes a portable wireless communication apparatus such as a portable telephone and the like, a personal computer and the like, as examples.

In the controller (2), when the current time is set by the user, and the current date and hour is changed to another current date and hour, the controller (2) changes the open date and hour. The relation between the current date and hour and the open date and hour prior to the change is equivalent to the relation between another current date and hour and the open date and hour after the change. Such change of the open date and hour disables the receiving person from opening the electronic mail by changing the current date and hour.

DESCRIPTION OF THE PREFERRED EMBODIMENTS

Figure 1:
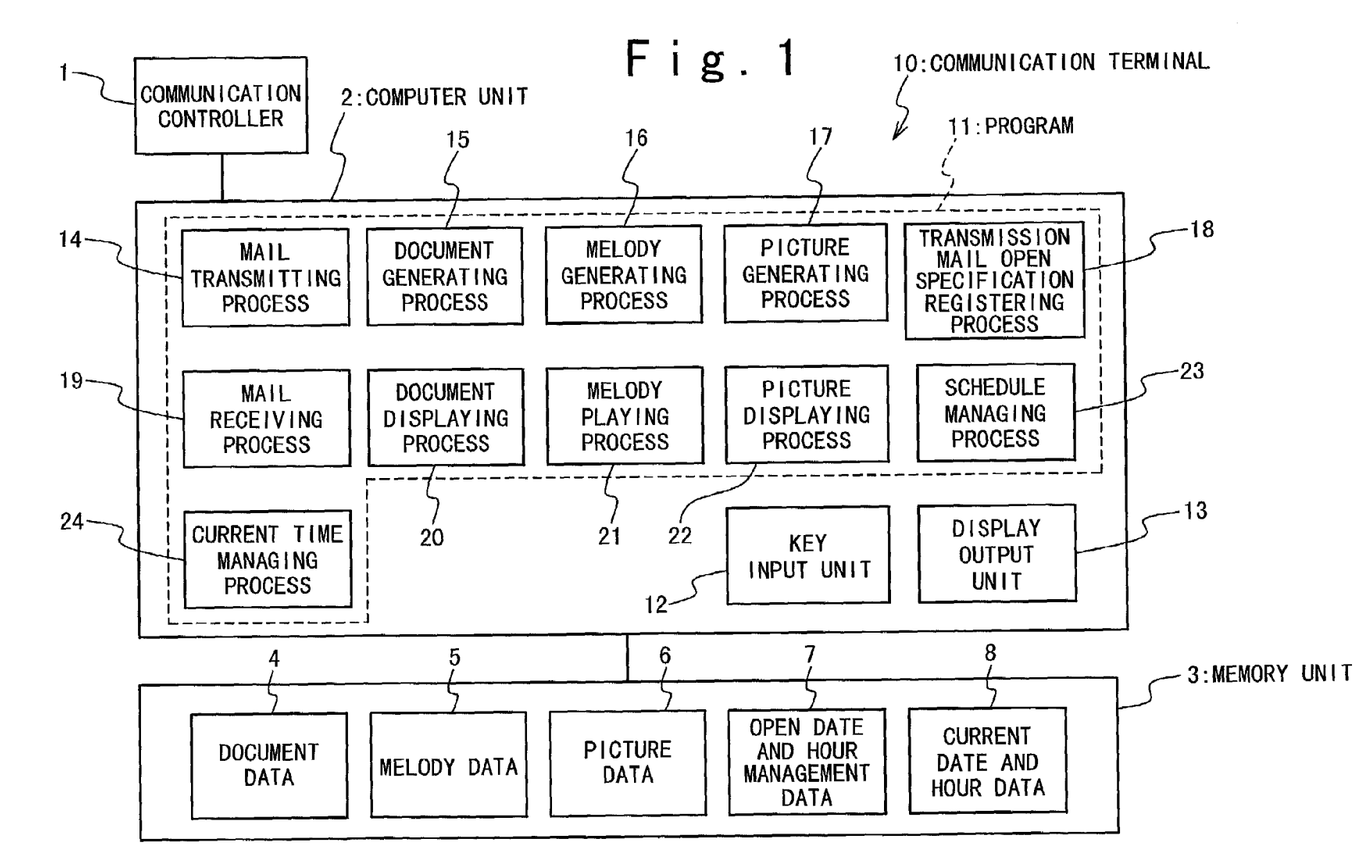
FIG. 1 is a block diagram showing a communication terminal for transmitting and receiving an electronic mail according to an embodiment of the present invention.

A method of transmitting and receiving an electronic mail, according to the present invention will be described below with reference to the attached drawings. FIG. 1 illustrates a communication terminal for transmitting and receiving an electronic mail in which an open date and hour is specified (hereinafter, referred to as "open date and hour specification electronic mail". For example, a portable wireless communication apparatus such as a portable telephone and the like, a personal computer and the like are used as the communication terminal 10. The communication terminal 10 is provided with a communication controller 1, a computer unit 2 and a memory unit 3. The communication controller 1 is connected to a communication line network (not shown) and connected to the computer unit 2. The computer unit 2 is connected to the memory unit 3.

The memory unit 3 records therein document data 4, melody data 5, picture data 6, open date and hour management data 7 and current date and hour data 8. The electronic mail is composed of the document data 4, the melody data 5 and/or the picture data 6. An open date and hour and data to inhibit a reading operation are further added to the electronic mail. The open date and hour indicates the date and hour when the communication terminal 10 receiving the open date and hour specification electronic mail can open the electronic mail. The open date and hour management data 7 is stored in a table constituted by a registration number of the open date and hour specification electronic mail received by the communication terminal 10 and the open date and hour appended to the open date and hour specification electronic mail. The registration number corresponds to the received open date and hour specification electronic mail. The current date and hour data 8 indicates a current date and hour.

The communication controller 1 receives an electronic mail through the communication line network, and outputs the received electronic mail to the computer unit 2. The communication controller 1 transmits an electronic mail generated by the computer unit 2, through the communication line network to another communication terminal.

The computer unit 2 includes a program 11, a key input unit 12 and a display output unit 13, and also includes a scheduler (not shown). The computer unit 2 executes the program 11 on the basis of an output of the key input unit 12. The key input unit 12 accepts a key input from a user. The display output unit 13 displays a message, a document based on the document data 4 or a picture based on the picture data 6 each which is indicated by the program 11, and plays a melody based on the melody data 5.

The scheduler registers schedule data correlated to a schedule date and hour. The schedule data is read out, as necessary of the user, or at a time of an arrival of the schedule date and hour, and then displayed on the display output unit 13. The schedule data is composed of the document data 4, the melody data 5 or the picture data 6.

The program 11 includes a mail transmitting process 14, a document generating process 15, a melody generating process 16, a picture generating process 17, a transmission mail open specification registering process 18, a mail receiving process 19, a document displaying process 20, a melody playing process 21, a picture displaying process 22, a schedule managing process 23 and a current time managing process 24.

The document generating process 15 generates the document data 4 on the basis of the output of the key input unit 12. The melody generating process 16 generates the melody data on the basis of the output of the key input unit 12. The picture generating process 17 generates the picture data 6 on the basis of the output of the key input unit 12. The transmission mail open specification registering process 18 adds the open date and hour and the data to inhibit the reading operation until arriving the open date and hour, to the generated electronic mail. The mail transmitting process 14 instructs transmission of the generated electronic mail to the communication controller 1.

The mail receiving process 19 receives the electronic mail received by the communication controller 1, and records the electronic mail in the memory unit 3. The document displaying process 20 displays the document data of the received electronic mail on the display output unit 13. The melody playing process 21 outputs the melody data of the electronic mail to the display output unit 13. The picture data displaying process 22 displays the picture data 6 of the electronic mail on the display output unit 13. The schedule managing process 23 displays a message of "Please, Set Current Date And Hour" on the display output unit 13, before registering the received electronic mail in the memory unit 3, if the current date and hour is not set for the communication terminal 10, when receiving the open date and hour specification electronic mail, to thereby prompt the user to set the current date and hour.

The current time managing process 24 reports a current date and hour to the schedule managing process 23 for each update of a current date and hour. Then, registered schedule data is displayed or played if the current date and hour agrees with a schedule date and hour. At a time of an arrival of the open date and hour of the open date and hour specification electronic mail, the current time managing process 24 deletes a specification date and hour management data 7 corresponding to the mail. The current time managing process 24, if the user changes a current date and hour, further calculates a relative time between an open date and hour and the current date and hour, adds the relative time to the changed current date and hour, and re-registers the addition result as the open date and hour.

Figure 2A:
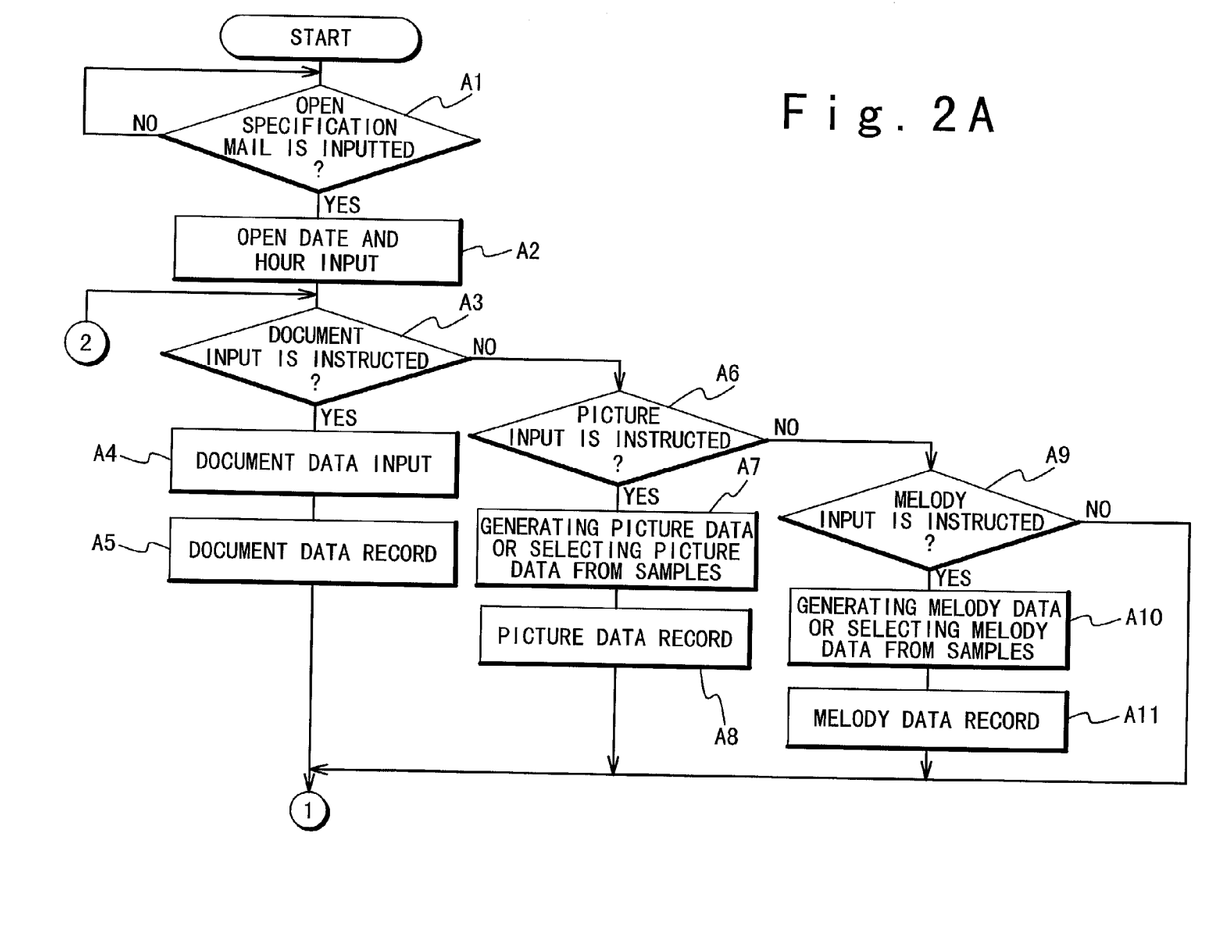
FIGS. 2A and 2B are flowcharts showing an embodiment of a method of transmitting an electronic mail, according to the present invention.
Figure 2B:
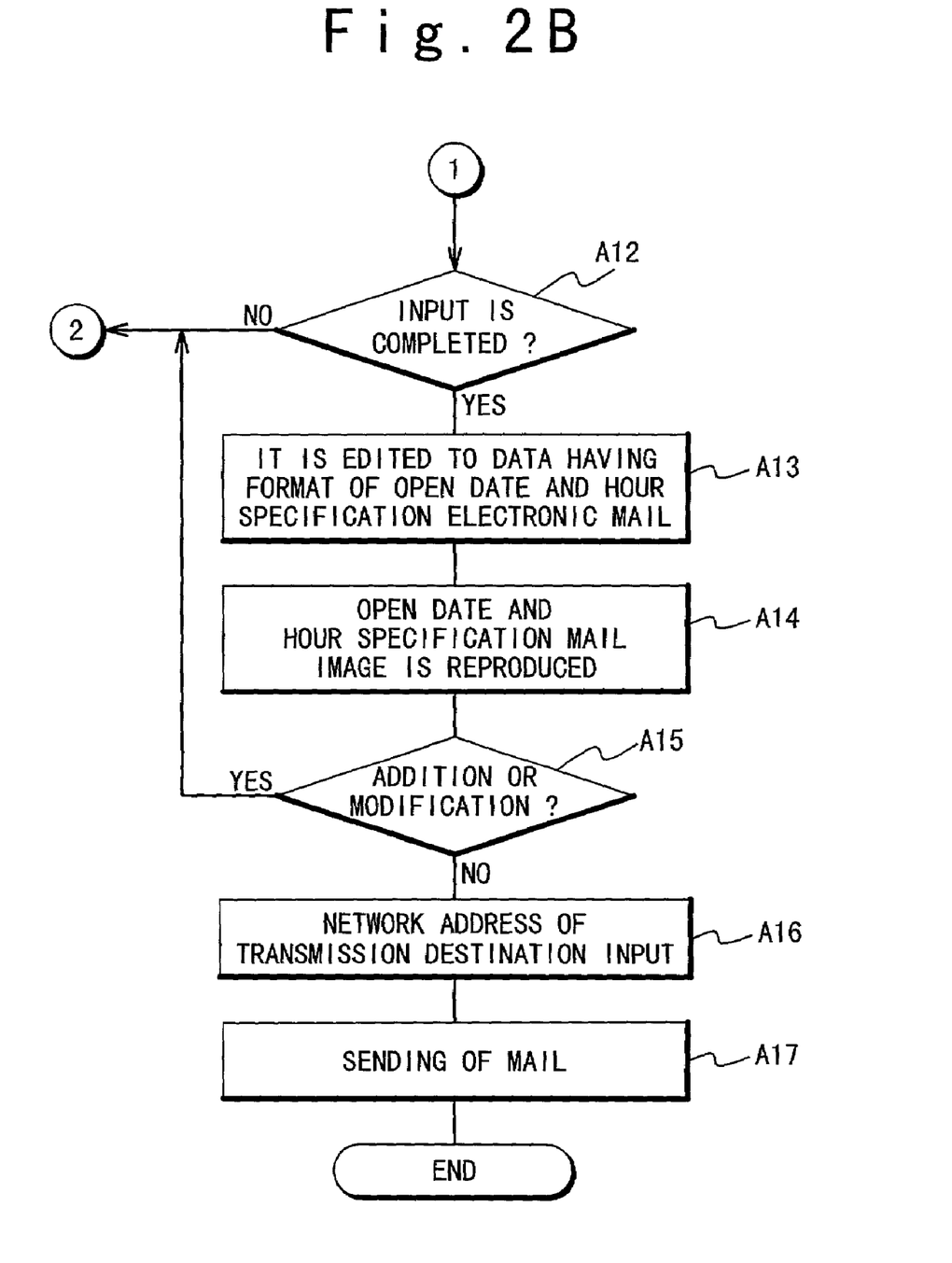

FIGS. 2A and 2B show the generating method and the transmitting method of an electronic mail in which an open date and hour is specified. It is checked whether or not an instruction of generating an open date and hour specification electronic mail is inputted by a user (Step A1). When it is judged that the instruction is inputted, the user inputs an open date and hour (Step A2). Then, it is checked whether or not a document input is instructed from the user (Step A3). In this Step A3, if it is judged that the document input is instructed (Step A3; YES), the user inputs document data through the key input unit 12, and the document generating process 15 generates the document data 4 (Step A4). The document data 4 is recorded in the memory unit 3 (Step A5). Also, prerecorded document data 4 is registered as an electronic mail.

In above Step A3, if it is judged that the document input is not instructed (Step A3; NO), it is checked whether or not a picture input is instructed from the user (Step A6). In this Step A6, if it is judged that the picture input is instructed (Step A6; YES), the user inputs picture data through the key input unit 12, and the picture data generating process 16 generates the picture data 5 (Step A7). Or, it is selected from pre-recorded picture data 5. Its picture data 5 is recorded in the memory unit 3 (Step A8). In above Step A6, if it is judged that the picture input is not instructed (Step A6; NO), it is checked whether or not a melody input is instructed from the user (Step A9). In this Step A9, if it is judged that the melody input is instructed (Step A9; YES), the user inputs the melody data through the key input unit 12, and the melody data generating process 17 generates the melody data 6 (Step A10). Or, it is selected from pre-recorded melody data 6. Its melody data 6 is recorded in the memory unit 3 (Step A11).

Next, it is checked whether or not an input of the electronic mail data is completed (Step A12). In this Step A12, if it is judged that the input of the electronic mail data is not completed (Step A12; NO), the operation at the step A3 is again executed to generate the electronic mail. On the other hand, in above Step A12, if it is judged that the input of the electronic mail data is completed (Step A12; YES), the transmission mail open specification registering process 18 encrypts the electronic mail data, and it is edited to data having a format of the open date and hour specification electronic mail (Step A13).

Then, the open date and hour specification electronic mail after the completion of the generation is once reproduced as a test (Step A14). At this time, the user can check the reproduced electronic mail. Next, it is checked whether or not the user desires an addition or modification of the reproduced electronic mail (Step A15). In this Step A15, if it is judged that the user desires to add or modify the electronic mail (Step A15; YES), the operation at the step A3 is again executed to generate the electronic mail. If it is judged that the user does not desire to add or modify the electronic mail (Step A15; NO), the user inputs a network address of a transmission destination of the open date and hour specification electronic mail (Step A16). The generated open date and hour specification electronic mail is sent to a destination indicated by the network address (Step A17).

Figure 3A:
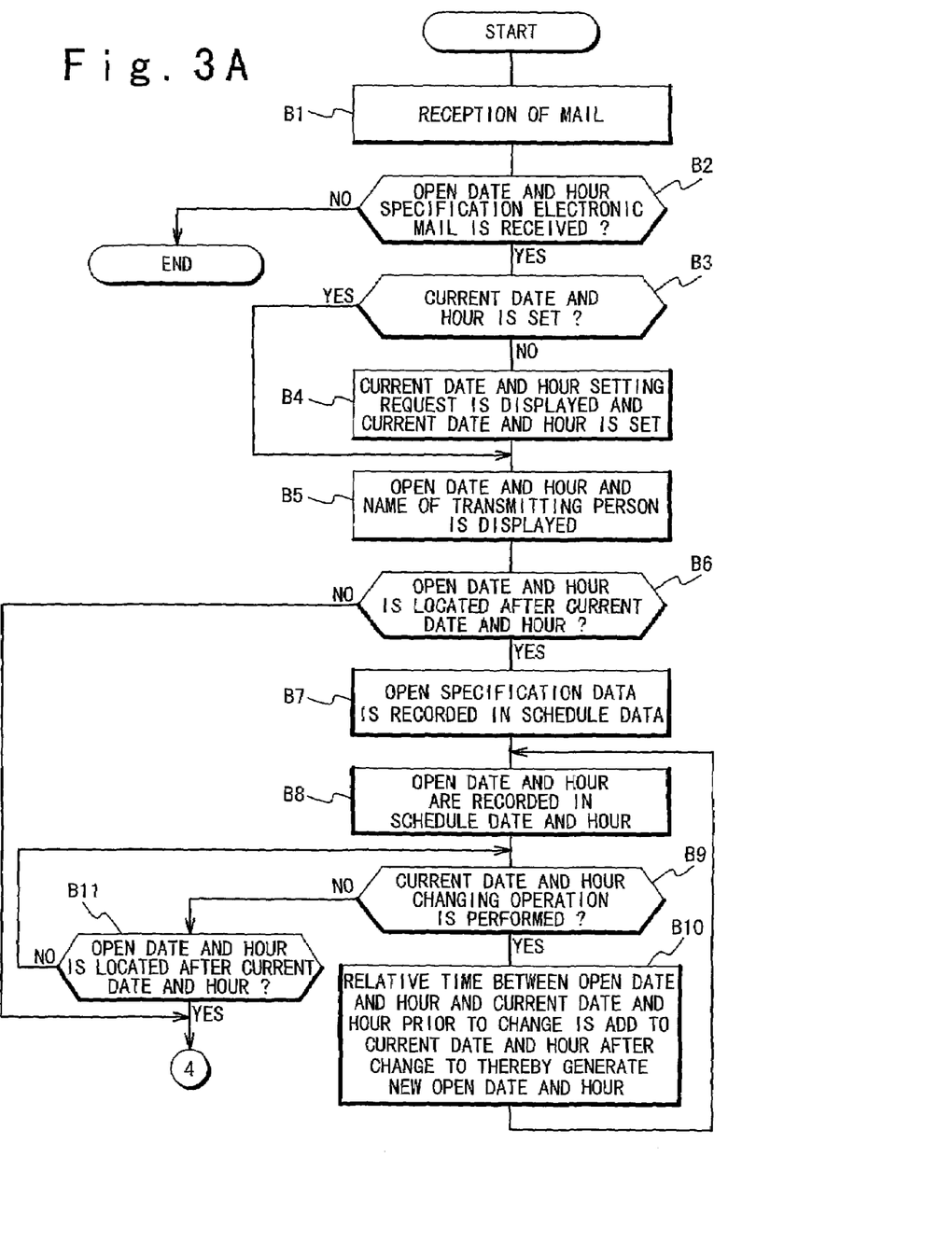
FIGS. 3A to 3C are flowcharts showing an embodiment of a method of receiving an electronic mail, according to the present invention.
Figure 3B:
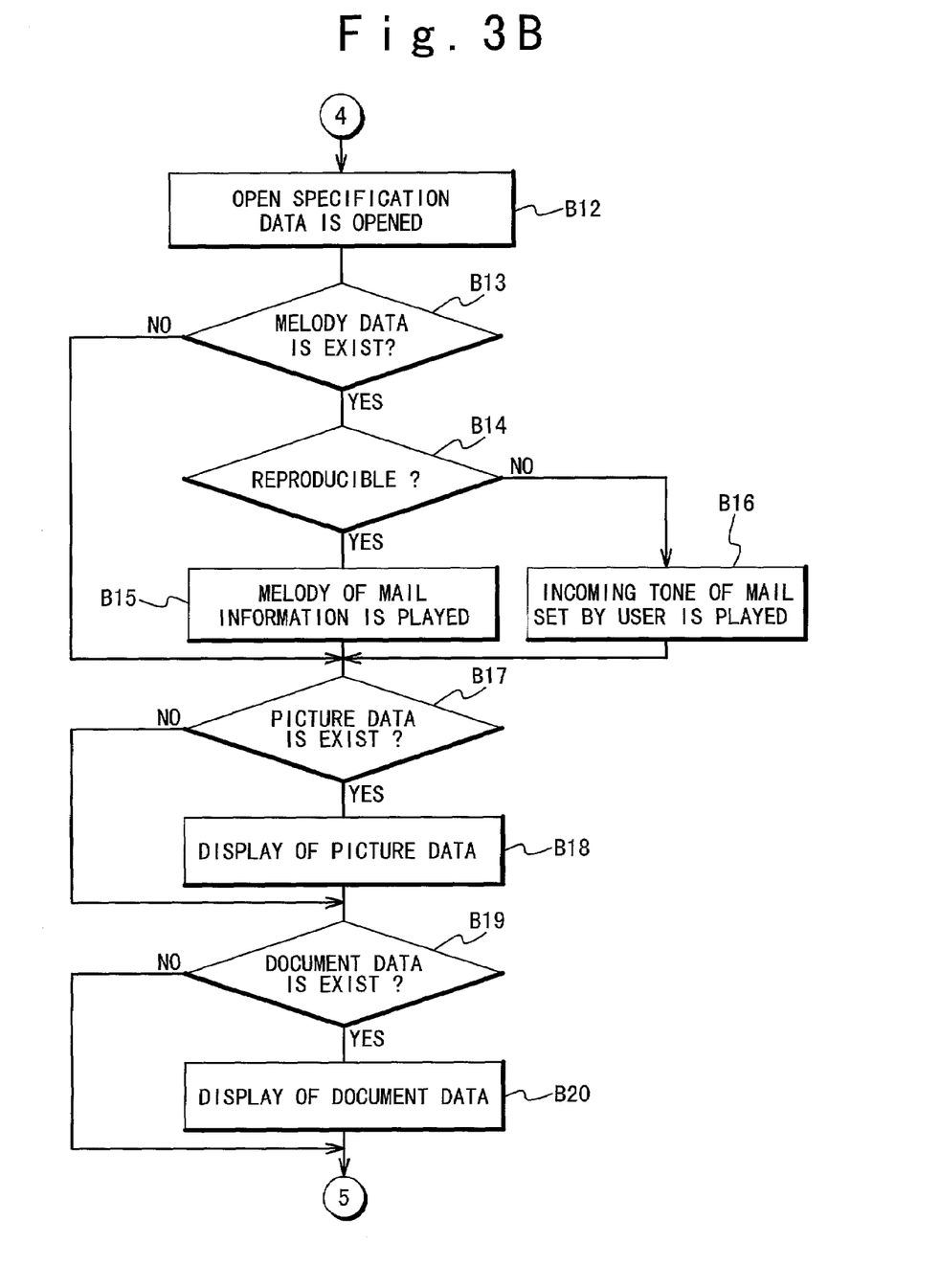
Figure 3C:
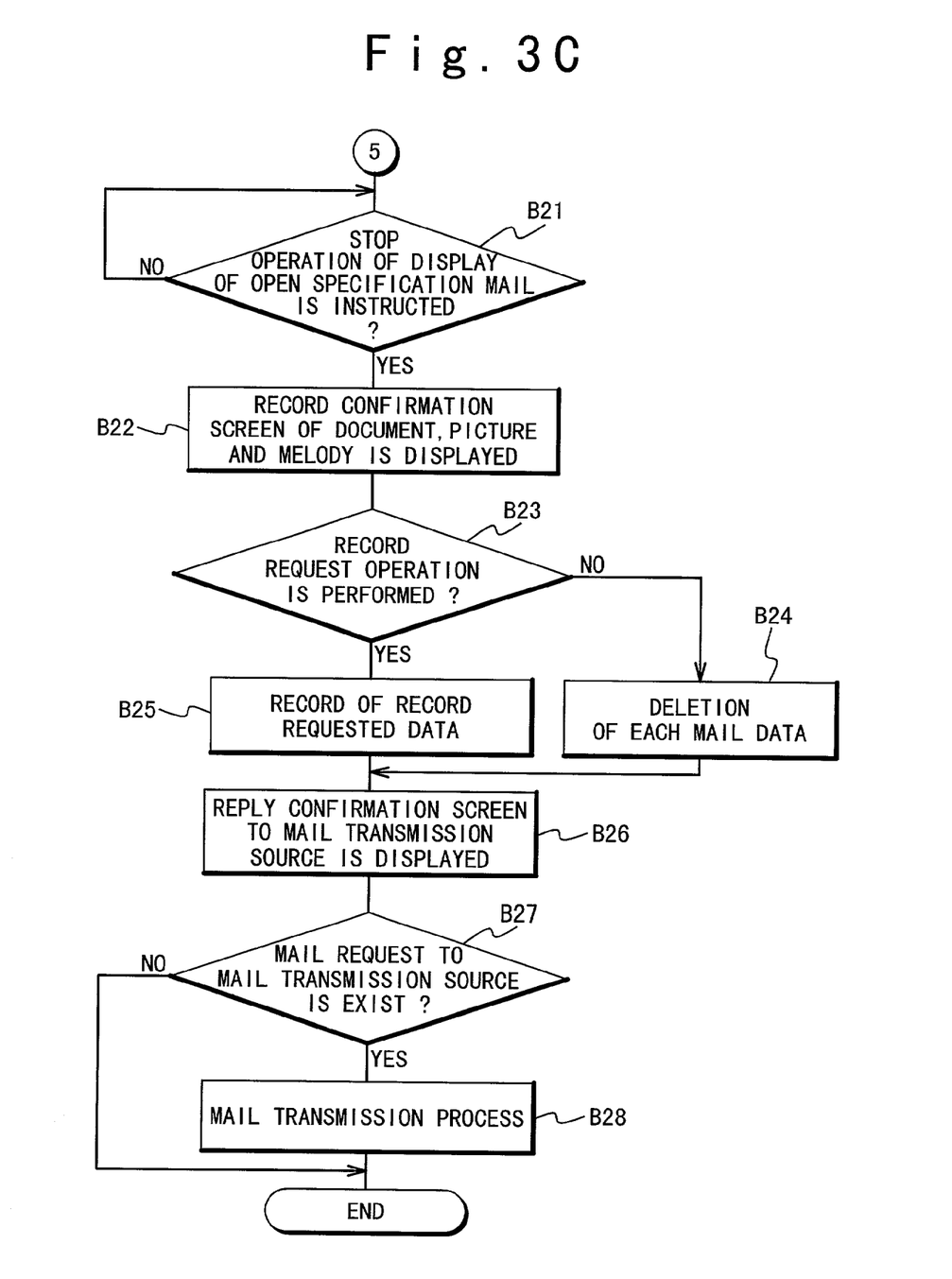

FIGS. 3A to 3C show the method of receiving an open date and hour specification electronic mail. The communication controller 1 receives an electronic mail from a communication line network (Step B1). Then, it is checked whether or not the received electronic mail is the open date and hour specification electronic mail (Step B2). If it is judged that the received electronic mail is not the open date and hour specification electronic mail (Step B2; NO), this receiving operation is ended. On the other hand, if it is judged that the received electronic mail is the open date and hour specification electronic mail (Step B2; YES), it is checked whether or not a current date and hour is set for the communication terminal 10 (Step B3).

When it is so judged that the current date and hour is not set for the communication terminal 10 (Step B3; NO), a message of "Please, Set Current Date And Hour" is displayed on the display output unit 13 for requiring the user to set the current date and hour. In response to this message, The user sets the current date and hour (Step B5).

An open date and hour and a name of a transmitting person of the received open date and hour specification electronic mail are displayed on the display output unit 13 (Step B5). Then, the context between the open date and hour and the current date and hour is checked (Step B6). If it is judged that the open date and hour is located before the current date and hour (Step B6; NO), the sequence is jumped to Step B12. On the other hand, if it is judged that the open date and hour is located after the current date and hour (Step B6; YES), a registration number is given to the open date and hour specification electronic mail, and the numbered open date and hour specification electronic mail is recorded in the memory unit 3 (Step B7). Also, the registration number and the open date and hour are recorded as the open date and hour management data 7 (Step B8).

After the open date and hour specification electronic mail is recorded, it is monitored and checked whether or not the current date and hour is changed by the user (Step B9). If it is judged that the current date and hour is changed and set (Step B9; YES), a relative time between the open date and hour and the current date and hour prior to the change is calculated to add the relative time to the current date and hour after the change. Then, the addition result is re-registered as the open date and hour (Step B10). After that, the operation at the step B8 is again executed. If it is judged that the current date and hour is not changed (Step B9; NO), it is checked whether or not the open date and hour is located after the current date and hour (Step B11). In this Step B11, it is judged that the open date and hour is not located after the current date and hour (Step B11; NO), the operation at the step B9 is again executed to monitor the change of the current date and hour.

If the open date and hour is located after the current date and hour (Step B6; NO or Step B11; NO), the data of the open date and hour specification electronic mail is decoded to thereby become at an openable state (Step B12).

Then, it is checked whether or not a melody data is included in the decoded open date and hour specification electronic mail (Step B13). In this Step B13, if it is judged that the melody data is not included in the mail (Step B13; NO), the sequence is jumped to Step B17. On the other hand, if it is judged that the melody data is included in the mail (Step B13; YES), it is checked whether or not the melody data can be reproduced (Step B14). In this step B14, it is judged that the melody data can be reproduced (Step B14; YES), the melody data is played by the display output unit 13 (Step B15). On the other hand, if it is judged that the melody data can not be played (Step B14; NO), an incoming tone of the electronic mail set by the user is played (Step B16).

Then, it is checked whether or not picture data is included in the decoded data (Step B17). In this Step B17, if it is judged that the picture data is included in the decoded data (Step B17; YES), the picture data is displayed on the display output unit 13 (Step B18). If it is judged that the picture data is not included in the decoded data (Step B17; NO), this Step B18 is skipped. Then, it is checked whether or not document data is included in the decoded data (Step B19). In this Step B19, if it is judged that the document data is included in the decoded data (Step B19; YES), the document data is displayed on the display output unit 13 (Step B20). If it is judged that the document data is not included in the decoded data (Step B19; NO), this Step B20 is skipped.

Then, it is checked whether or not the stop of the play or the display of the electronic mail is indicated is monitored (Step B21). If it is judged that the stop is indicated (Step B21; YES), a message for prompting the user to indicate whether or not the data is stored is displayed (Step B22). Then, it is checked whether or not the indication to store the data of the electronic mail is performed (Step B23). In this Step B23, if it is judged that the indication to store the data of the electronic mail is not exist (Step B23; NO), the data of the electronic mail is deleted (Step B24). On the other hand, if it is judged that the indication to store the data of the electronic mail from the user is exist (Step B23; YES), the data of the electronic mail which is requested to be stored is recorded in the memory unit 3 (Step B25).

Then, a reply check screen to check whether or not a reply is transmitted to a mail transmission source is displayed on the display output unit 13. So, it prompts the user to indicate whether or not the reply is transmitted (Step B26). Then, it is checked whether or not a mail request is exist in the mail transmission source (Step B27). If it is judged that the mail request is exist, and the user transmits the reply to the mail transmission source (Step B27; YES), the mail transmitting process 14 transmits a reply mail to the mail transmission source (Step B28).

In the method of transmitting and receiving an electronic mail according to the present invention, the transmitting person of the electronic mail can specify the period in which the receiving person of the electronic mail can open the electronic mail. As a result, for example, if a message is transmitted through the electronic mail between friends on a memorial day such as a birthday or the like, the electronic mail can be transmitted before several days and its content can be concealed from a receiving person until the specified date. Moreover, since the receiving person is anxious about the content of the electronic mail, the receiving person can get the joy of waiting for the open date and hour.

In one embodiment of the method of transmitting and receiving an electronic mail according to the present invention, the electronic mail data recorded in the communication terminal on the receiving side can be further removed by the intention of the user on the transmitting side. The mail deletion key code further belongs to the open date and hour specification electronic mail. Only the transmitting person can determine the mail deletion key code. The open date and hour management data 7 is constituted by the registration number corresponding to the open date and hour specification electronic mail, the open date and hour belonging to the open date and hour specification electronic mail and the mail deletion key code. If the same mail deletion key code exists in the open date and hour management data 7, the data of the electronic mail corresponding to the mail deletion key code is deleted to accordingly delete the open date and hour management data 7 corresponding to the electronic mail.

The communication terminal on the transmitting side adds the mail deletion key code to the open date and hour specification electronic mail, and then transmits the open date and hour specification electronic mail. The communication terminal on the receiving side records the mail deletion key code of the received open date and hour specification electronic mail together with the open date and hour as the open date and hour management data 7. After that, if the transmitting person desires to delete the electronic mail recorded in the communication terminal on the receiving side, the transmitting person transmits the electronic mail to which the same mail deletion key code is added, to the communication terminal on the receiving side.

The communication terminal on the receiving side retrieves the mail deletion key code of the received electronic mail from the open date and hour management data 7. If the same mail deletion key code exists in the open date and hour management data 7, it deletes the data of the electronic mail corresponding to the mail deletion key code, and then deletes the open date and hour management data 7 corresponding to the electronic mail.

The user on the transmitting side, if erroneously transmitting the open date and hour specification electronic mail to a non-intended communication terminal, can remove the electronic mail data recorded in the communication terminal on the receiving side.

As described above, in the method of transmitting and receiving an electronic mail according to the present invention, the transmitting person of the electronic mail can specify the period in which the receiving person of the electronic mail can open the electronic mail.

What is claimed is:

1. A method of transmitting and receiving an electronic mail comprising:
   generating an encoded electronic mail to which open date and hour data indicating an open date and hour at which the electronic mail may be opened are added in a transmitting side communication terminal;
   decoding and opening said encoded electronic mail at a receiving side communication terminal after a current date and hour reach said open date and hour;
   preventing said encoded electronic mail from being decoded at said receiving side communication terminal receiving said encoded electronic mail, until said current date and hour reach said open date and hour; and
   requiring, based on the receipt of the electronic mail, said receiving side communication terminal to set said current date and hour when said receiving side communication terminal does not have said current date and hour set.

2. The method of transmitting and receiving the electronic mail according to claim 1, further comprising:
   when said current date and hour is changed to another current date and hour, changing said open date and hour based on said current date and hour and said another current date and hour.

3. The method of transmitting and receiving the electronic mail according to claim 2, wherein a relation between said current date and hour and said open date and hour prior to the change is equivalent to a relation between said other current date and hour and said open date and hour after the change.

4. The method of transmitting and receiving the electronic mail according to claim 2, further comprising:
   requiring said receiving side communication terminal to open said encoded electronic mail when said current date and hour reach said open date and hour.

5. The method of transmitting and receiving the electronic mail according to claim 2, further comprising:

further adding a mail deletion key code to said encoded electronic mail;

recording said received encoded electronic mail together with said mail deletion key code; and deleting said encoded electronic mail having same mail deletion key code.

6. The method of transmitting and receiving the electronic mail according to claim 1, further comprising:

requiring said receiving side communication terminal to open said encoded electronic mail when said current date and hour reach said open date and hour.

7. The method of transmitting and receiving the electronic mail according to claim 1, further comprising:

further adding a mail deletion key code to said encoded electronic mail;

recording said received encoded electronic mail together with said mail deletion key code; and deleting said encoded electronic mail having same mail deletion key code.

8. A method of transmitting and receiving an electronic mail comprising:

generating an encoded electronic mail to which open date and hour data indicating an open date and hour at which the electronic mail may be opened are added in a transmitting side communication terminal;

decoding and opening said encoded electronic mail at a receiving side communication terminal after a current date and hour reach said open date and hour;

when said current date and hour are changed to another current date and hour, changing said open date and hours based on said current date and said another current date and hour.

9. The method of transmitting and receiving the electronic mail according to claim 8, wherein a relation between said current date and hour and said open date and hour prior to the change is equivalent to a relation between said other current date and hour and said open date and hour after the change.

10. The method of transmitting and receiving the electronic mail according to claim 8, further comprising:

requiring said receiving side communication terminal to open said encoded electronic mail when said current date and hour reach said open date and hour.

11. The method of transmitting and receiving the electronic mail according to claim 8, further comprising:

further adding a mail deletion key code to said encoded electronic mail;

recording said received encoded electronic mail together with said mail deletion key code; and deleting said encoded electronic mail having same mail deletion key code.

12. A terminal apparatus comprising:

a receiver which receives an encoded electronic mail to which open date and hour data indicating an open date and hour at which the electronic mail may be opened are added in a transmitting side communication terminal; and a controller which decodes and opens said encoded electronic mail received by said receiver, after current date and hour reach said open date and hour.

wherein said controller set said current date and hour, and changes said open date and hour when said current date and hour are changed to another current date and hour, and wherein a relation between said current date and hour and said open date and hour prior to the change is equivalent to a relation between said other current date and hour and said open date and hour after the change.

* * * * *